(12) United States Patent
Bastien et al.

(10) Patent No.: US 9,342,230 B2
(45) Date of Patent: May 17, 2016

(54) NATURAL USER INTERFACE SCROLLING AND TARGETING

(71) Applicant: MICROSOFT TECHNOLOGY LICENSING, LLC, Redmond, WA (US)

(72) Inventors: David Bastien, Kirkland, WA (US); Oscar Murillo, Redmond, WA (US); Mark Schwesinger, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 286 days.

(21) Appl. No.: 13/802,234

(22) Filed: Mar. 13, 2013

(65) Prior Publication Data

US 2014/0282223 A1    Sep. 18, 2014

(51) Int. Cl.
*G06F 3/0485*    (2013.01)
*G06F 3/01*    (2006.01)

(52) U.S. Cl.
CPC .............. *G06F 3/0485* (2013.01); *G06F 3/017* (2013.01)

(58) Field of Classification Search
CPC ........................................................ G06F 3/0485
USPC ........................................................... 715/784
See application file for complete search history.

(56) References Cited

U.S. PATENT DOCUMENTS

| | | | | |
|---|---|---|---|---|
| 5,686,940 | A * | 11/1997 | Kuga | 345/156 |
| 9,007,302 | B1 * | 4/2015 | Bandt-Horn | 345/156 |
| 2006/0033701 | A1 * | 2/2006 | Wilson | 345/156 |
| 2006/0105838 | A1 * | 5/2006 | Mullen | 463/31 |
| 2008/0143675 | A1 * | 6/2008 | Hsieh et al. | 345/158 |
| 2009/0103780 | A1 * | 4/2009 | Nishihara et al. | 382/103 |
| 2009/0237371 | A1 * | 9/2009 | Kim et al. | 345/173 |
| 2010/0146464 | A1 | 6/2010 | Wilson et al. | |
| 2010/0235786 | A1 * | 9/2010 | Maizels et al. | 715/810 |
| 2011/0193939 | A1 * | 8/2011 | Vassigh et al. | 348/46 |
| 2011/0197263 | A1 * | 8/2011 | Stinson, III | 726/4 |
| 2011/0289456 | A1 | 11/2011 | Reville et al. | |
| 2012/0054670 | A1 * | 3/2012 | Rainisto | 715/784 |
| 2012/0066638 | A1 * | 3/2012 | Ohri | 715/784 |
| 2012/0068925 | A1 | 3/2012 | Wong et al. | |
| 2012/0155705 | A1 | 6/2012 | Latta et al. | |
| 2012/0157208 | A1 | 6/2012 | Reville et al. | |
| 2012/0162267 | A1 * | 6/2012 | Shimazu | 345/684 |
| 2012/0223882 | A1 * | 9/2012 | Galor et al. | 345/157 |
| 2012/0308140 | A1 * | 12/2012 | Ambrus et al. | 382/190 |
| 2013/0055150 | A1 * | 2/2013 | Galor | 715/784 |
| 2013/0076617 | A1 * | 3/2013 | Csaszar et al. | 345/156 |
| 2013/0144583 | A1 * | 6/2013 | Hemanthkumar et al. | 703/10 |

(Continued)

OTHER PUBLICATIONS

"Qt Kinetic Scrolling—from Idea to Implementation", Retrieved at <<http://www.developer.nokia.com/Community/Wiki/Qt_Kinetic_scrolling_-_from_idea_to_implementation>>, Jan. 16, 2012, pp. 4.

(Continued)

*Primary Examiner* — Reza Nabi
*Assistant Examiner* — Daniel Rodriguez
(74) *Attorney, Agent, or Firm* — Aaron Chatterjee; Judy Yee; Micky Minhas

(57) ABSTRACT

A user interface is output to a display device. If an element of a human subject is in a first conformation, the user interface scrolls responsive to movement of the element. If the element is in a second conformation, different than the first conformation, objects of the user interface are targeted responsive to movement of the element without scrolling the user interface.

16 Claims, 11 Drawing Sheets

(56) References Cited

U.S. PATENT DOCUMENTS

| | | | | |
|---|---|---|---|---|
| 2013/0207909 | A1* | 8/2013 | Tanzawa et al. | 345/173 |
| 2013/0222241 | A1* | 8/2013 | Jeong | 345/158 |
| 2013/0222246 | A1* | 8/2013 | Booms et al. | 345/168 |
| 2014/0062875 | A1* | 3/2014 | Rafey et al. | 345/158 |
| 2014/0115532 | A1* | 4/2014 | Suzuki et al. | 715/790 |
| 2014/0157206 | A1* | 6/2014 | Ovsiannikov et al. | 715/849 |
| 2014/0173504 | A1 | 6/2014 | Gup et al. | |
| 2014/0208260 | A1* | 7/2014 | Kawahara et al. | 715/784 |
| 2015/0234529 | A1* | 8/2015 | Kim et al. | 715/784 |

OTHER PUBLICATIONS

Varma, Krishnaraj, "Gesture Detection in Android, Part 1 of 2", Retrieved at <<http://www.krvarma.com/2010/10/gesture-detection-in-android-part-1-of-2/>>, Oct. 10, 2010, pp. 5.

Gardiner, Bryan, "An Accessory that Replaces Mouse Movements with Hand Waves", Retrieved at <<http://www.popsci.com/gadgets/article/2012-08/accessory-replaces-mouse-movements-hand-waves>>, Sep. 14, 2012, pp. 5.

"NPointer—Hand or Arm Gestures Control Computer without Mouse or Touchpad", Retrieved at <<http://www.disabled-world.com/assistivedevices/computer/npointer.php#ixzz2D1Cbqlpf>>, Aug. 21, 2012, pp. 2.

"Kinect Gestures", Retrieved at <<http://support.xbox.com/en-GB/xbox-360/kinect/body-controller>>, Retrieved Date: Nov. 22, 2012, pp. 3.

ISA European Patent Office, International Search Report & Written Opinion for PCT/US2014/024542, WIPO, Aug. 28, 2014, 12 Pages.

* cited by examiner

NATURAL USER INTERFACE SCROLLING AND TARGETING

BACKGROUND

User interfaces are typically controlled with keyboards, mice, track pads, and other peripheral devices. Recently, natural user interfaces that are controlled by human gestures have been developed to provide a more natural user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A user interface is output to a display device. If an element of a human subject is in a first conformation, the user interface scrolls responsive to movement of the element. If the element is in a second conformation, different than the first conformation, objects of the user interface are targeted responsive to movement of the element without scrolling the user interface.

DETAILED DESCRIPTION

Figure 1:
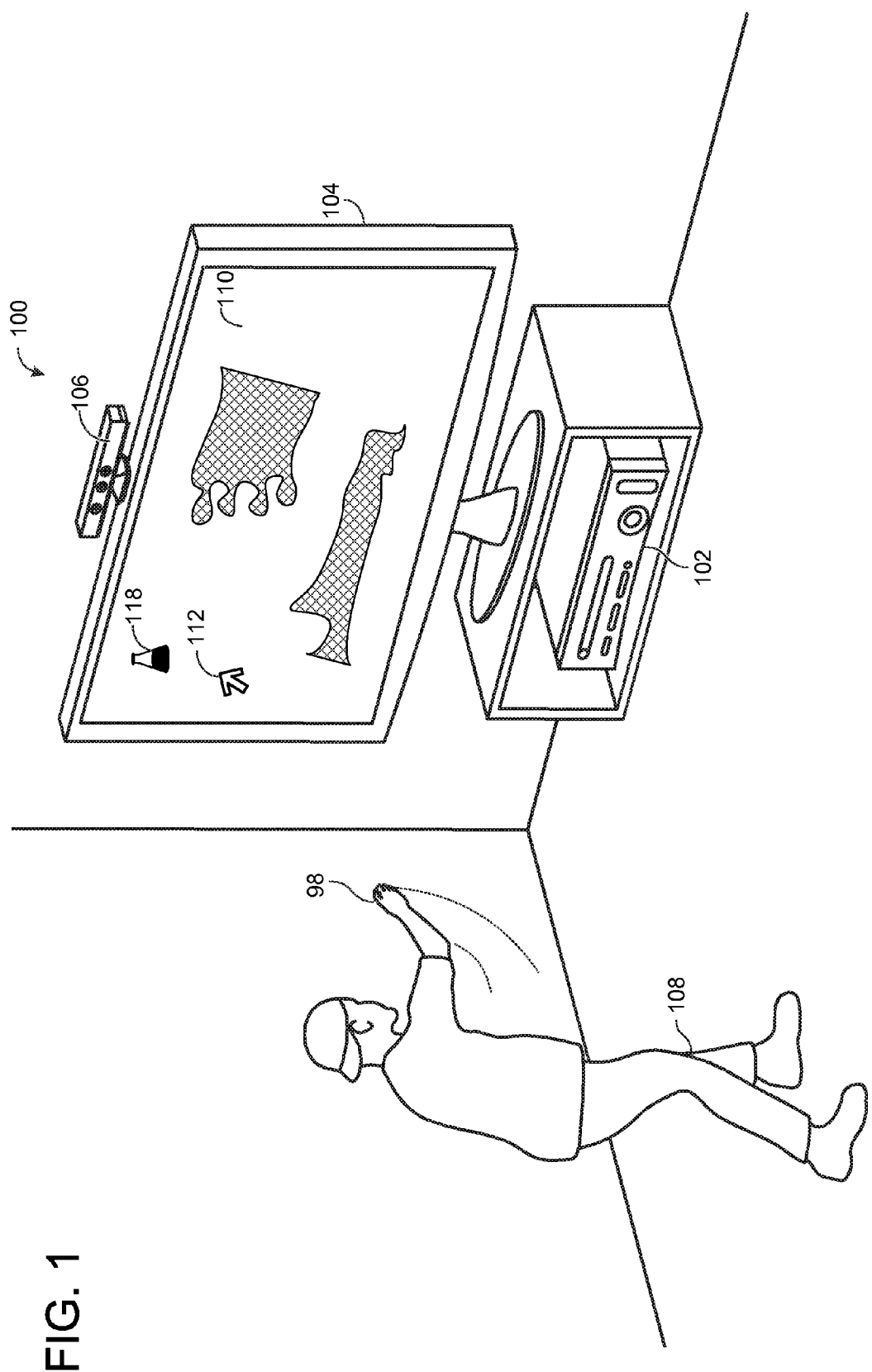
FIG. 1 schematically shows a non-limiting example of a control environment.

FIG. 1 shows a non-limiting example of a control environment 100. In particular, FIG. 1 shows an entertainment system 102 that may be used to play a variety of different games, play one or more different media types, and/or control or manipulate non-game applications and/or operating systems. FIG. 1 also shows a display device 104 such as a television or a computer monitor, which may be used to present media content, game visuals, etc., to users. As one example, display device 104 may be used to visually present media content received by entertainment system 102. In the example illustrated in FIG. 1, display device 104 is displaying a scrollable user interface 110 received from entertainment system 102 that, in one example, presents selectable information about media content received by entertainment system 102. The control environment 100 may include a capture device, such as a depth camera 106 that visually monitors or tracks objects and users within an observed scene.

Display device 104 may be operatively connected to entertainment system 102 via a display output of the entertainment system. For example, entertainment system 102 may include an HDMI or other suitable wired or wireless display output. Display device 104 may receive video content from entertainment system 102, and/or it may include a separate receiver configured to receive video content directly from a content provider.

The depth camera 106 may be operatively connected to the entertainment system 102 via one or more interfaces. As a non-limiting example, the entertainment system 102 may include a universal serial bus to which the depth camera 106 may be connected. Depth camera 106 may be used to recognize, analyze, and/or track one or more human subjects and/or objects within a physical space, such as user 108. Depth camera 106 may include an infrared light to project infrared light onto the physical space and a depth camera configured to receive infrared light.

Entertainment system 102 may be configured to communicate with one or more remote computing devices, not shown in FIG. 1. For example, entertainment system 102 may receive video content directly from a broadcaster, third party media delivery service, or other content provider. Entertainment system 102 may also communicate with one or more remote services via the Internet or another network, for example in order to analyze image information received from depth camera 106.

While the embodiment depicted in FIG. 1 shows entertainment system 102, display device 104, and depth camera 106 as separate elements, in some embodiments one or more of the elements may be integrated into a common device.

One or more aspects of entertainment system 102 and/or display device 104 may be controlled via wireless or wired control devices. For example, media content output by entertainment system 102 to display device 104 may be selected based on input received from a remote control device, computing device (such as a mobile computing device), handheld game controller, etc. Further, in embodiments elaborated below, one or more aspects of entertainment system 102 and/or display device 104 may be controlled based on natural user input, such gesture commands performed by a user and interpreted by entertainment system 102 based on image information received from depth camera 106.

FIG. 1 shows a scenario in which depth camera 106 tracks user 108 so that the movements of user 108 may be interpreted by entertainment system 102. In some embodiments, the movements of user 108 are interpreted as controls that can be used to control a virtual pointer 112 displayed on display device 104 as part of scrollable user interface 110. In other words, user 108 may use his movements to control selection of information presented in scrollable user interface 110. Further, while not shown in FIG. 1, other input devices may also be used to control the location of virtual pointer 112, such as a remote control device or touch-sensitive input device.

Figure 2:
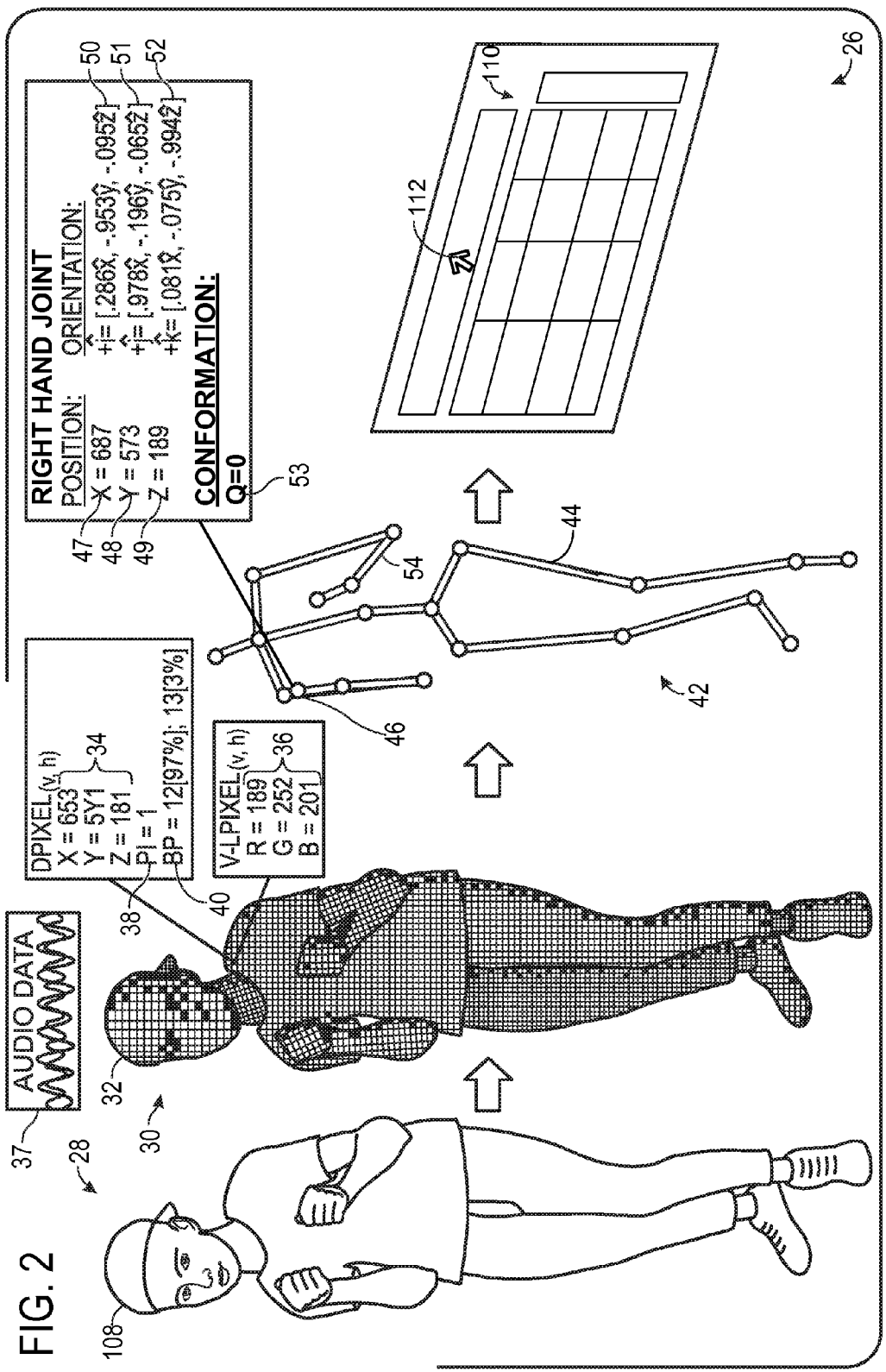
FIG. 2 schematically shows an example of a skeletal tracking pipeline.

FIG. 2 graphically shows a simplified skeletal tracking pipeline 26 of a depth analysis system that may be used to track and interpret movements of user 108. For simplicity of explanation, skeletal tracking pipeline 26 is described with reference to entertainment system 102 and depth camera 106 of FIG. 1. However, skeletal tracking pipeline 26 may be implemented on any suitable computing system without departing from the scope of this disclosure. For example, skeletal tracking pipeline 26 may be implemented on computing system 1100 of FIG. 11. Furthermore, skeletal tracking pipelines that differ from skeletal tracking pipeline 26 may be used without departing from the scope of this disclosure.

At 28, FIG. 2 shows user 108 from the perspective of a tracking device. The tracking device, such as depth camera 106, may include one or more sensors that are configured to observe a human subject, such as user 108.

At 30, FIG. 2 shows a schematic representation 32 of the observation data collected by a tracking device, such as depth camera 106. The types of observation data collected will vary depending on the number and types of sensors included in the tracking device. In the illustrated example, the tracking device includes a depth camera, a visible light (e.g., color) camera, and a microphone.

The depth camera may determine, for each pixel of the depth camera, the depth of a surface in the observed scene relative to the depth camera. A three-dimensional x/y/z coordinate may be recorded for every pixel of the depth camera. FIG. 2 schematically shows the three-dimensional x/y/z coordinates 34 observed for a DPixel[v,h] of a depth camera. Similar three-dimensional x/y/z coordinates may be recorded for every pixel of the depth camera. The three-dimensional x/y/z coordinates for all of the pixels collectively constitute a depth map. The three-dimensional x/y/z coordinates may be determined in any suitable manner without departing from the scope of this disclosure.

The visible-light camera may determine, for each pixel of the visible-light camera, the relative light intensity of a surface in the observed scene for one or more light channels (e.g., red, green, blue, grayscale, etc.). FIG. 2 schematically shows the red/green/blue color values 36 observed for a V-LPixel[v, h] of a visible-light camera. Red/green/blue color values may be recorded for every pixel of the visible-light camera. The red/green/blue color values for all of the pixels collectively constitute a digital color image. The red/green/blue color values may be determined in any suitable manner without departing from the scope of this disclosure.

The depth camera and visible-light camera may have the same resolutions, although this is not required. Whether the cameras have the same or different resolutions, the pixels of the visible-light camera may be registered to the pixels of the depth camera. In this way, both color and depth information may be determined for each portion of an observed scene by considering the registered pixels from the visible light camera and the depth camera (e.g., V-LPixel[v,h] and DPixel[v,h]).

One or more microphones may determine directional and/or non-directional sounds coming from user 108 and/or other sources. FIG. 2 schematically shows audio data 37 recorded by a microphone. Audio data may be recorded by a microphone of depth camera 106. Such audio data may be determined in any suitable manner without departing from the scope of this disclosure.

The collected data may take the form of virtually any suitable data structure(s), including but not limited to one or more matrices that include a three-dimensional x/y/z coordinate for every pixel imaged by the depth camera, red/green/blue color values for every pixel imaged by the visible-light camera, and/or time resolved digital audio data. User 108 may be continuously observed and modeled (e.g., at 30 frames per second). Accordingly, data may be collected for each such observed frame. The collected data may be made available via one or more Application Programming Interfaces (APIs) and/or further analyzed as described below.

The depth camera 106, entertainment system 102, and/or a remote service optionally may analyze the depth map to distinguish human subjects and/or other targets that are to be tracked from non-target elements in the observed depth map. Each pixel of the depth map may be assigned a user index 38 that identifies that pixel as imaging a particular target or non-target element. As an example, pixels corresponding to a first user can be assigned a user index equal to one, pixels corresponding to a second user can be assigned a user index equal to two, and pixels that do not correspond to a target user can be assigned a user index equal to zero. Such user indices may be determined, assigned, and saved in any suitable manner without departing from the scope of this disclosure.

The depth camera 106, entertainment system 102, and/or remote service optionally may further analyze the pixels of the depth map of user 108 in order to determine what part of the user's body each such pixel is likely to image. A variety of different body-part assignment techniques can be used to assess which part of the user's body a particular pixel is likely to image. Each pixel of the depth map with an appropriate user index may be assigned a body part index 40. The body part index may include a discrete identifier, confidence value, and/or body part probability distribution indicating the body part, or parts, to which that pixel is likely to image. Body part indices may be determined, assigned, and saved in any suitable manner without departing from the scope of this disclosure.

At 42, FIG. 2 shows a schematic representation of a virtual skeleton 44 that serves as a machine-readable representation of user 108. Virtual skeleton 44 includes twenty virtual joints—{head, shoulder center, spine, hip center, right shoulder, right elbow, right wrist, right hand, left shoulder, left elbow, left wrist, left hand, right hip, right knee, right ankle, right foot, left hip, left knee, left ankle, and left foot}. This twenty joint virtual skeleton is provided as a nonlimiting example. Virtual skeletons in accordance with the present disclosure may have virtually any number of joints.

The various skeletal joints may correspond to actual joints of user 108, centroids of the user's body parts, terminal ends of the user's extremities, and/or points without a direct anatomical link to the user. Each joint may have at least three degrees of freedom (e.g., world space x, y, z). As such, each joint of the virtual skeleton is defined with a three-dimensional position. For example, a right hand virtual joint 46 is defined with an x coordinate position 47, a y coordinate position 48, and a z coordinate position 49. The position of the joints may be defined relative to any suitable origin. As one example, the depth camera may serve as the origin, and all joint positions are defined relative to the depth camera. Joints may be defined with a three-dimensional position in any suitable manner without departing from the scope of this disclosure.

A variety of techniques may be used to determine the three-dimensional position of each joint. Skeletal fitting techniques may use depth information, color information, body part information, and/or prior trained anatomical and kinetic information to deduce one or more skeleton(s) that closely model a human subject. As one non-limiting example, the above described body part indices may be used to find a three-dimensional position of each skeletal joint.

A joint orientation may be used to further define one or more of the virtual joints. Whereas joint positions may describe the position of joints and virtual bones that span between joints, joint orientations may describe the orientation of such joints and virtual bones at their respective positions. As an example, the orientation of a wrist joint may be used to describe if a hand located at a given position is facing up or down.

Joint orientations may be encoded, for example, in one or more normalized, three-dimensional orientation vector(s). The orientation vector(s) may provide the orientation of a joint relative to the depth camera or another reference (e.g., another joint). Furthermore, the orientation vector(s) may be defined in terms of a world space coordinate system or another suitable coordinate system (e.g., the coordinate system of another joint). Joint orientations also may be encoded via other means. As non-limiting examples, quaternions and/or Euler angles may be used to encode joint orientations.

FIG. 2 shows a non-limiting example in which right hand joint 46 is defined with orthonormal orientation vectors 50, 51, and 52. In other embodiments, a single orientation vector may be used to define a joint orientation. The orientation vector(s) may be calculated in any suitable manner without departing from the scope of this disclosure.

A joint conformation may be used to further define one or more of the virtual joints. Whereas joint positions may describe the position of joints and virtual bones that span between joints, and joint orientations may describe the orientation of such joints and virtual bones at their respective positions, joint conformations may describe other aspects of the joints, virtual bones, and/or body parts associated therewith. As an example, the conformation of a hand joint may be used to describe whether a corresponding hand is in an open-grip or closed-grip conformation.

Joint conformations may be encoded, for example, as a one dimensional number or vector. As a non-limiting example, a joint conformation number or variable may be assigned to a joint.

FIG. 2 shows a non-limiting example in which right hand joint 46 is defined with a number 53. In this example, the conformation of right hand joint 46 is stored as a machine readable variable Q. The right hand joint 46 depicted in FIG. 2 is in a closed-grip conformation and the variable Q has been assigned a value of 0. In this example, an open-grip conformation of right hand joint 46 would result in the variable Q being assigned a value of 1. In some examples, a plurality of hand joint conformations including pointing, waving, gripping an object, crossing fingers, etc. may be distinguishable and assigned different values.

While the above description discusses potential conformations for a virtual hand joint, it is to be understood that other joints may be assigned one or more conformation variables suitable for the different possible conformations of those particular joints. For example, a head joint could be assigned a value based on the head joint being in either an open-mouthed or closed-mouthed conformation.

In some examples, a conformation variable may be assigned to different possible conformations of a plurality of joints. For example, two hand joints in close proximity may adopt a plurality of possible conformations (e.g. hands clasped, clapping, etc), and each conformation variable may be assigned a value.

Joint positions, orientations, conformations, and/or other information may be encoded in any suitable data structure(s). Furthermore, the position, orientation, and/or other parameters associated with any particular joint may be made available via one or more APIs.

As seen in FIG. 2, virtual skeleton 44 may optionally include a plurality of virtual bones (e.g. a left forearm bone 54). The various skeletal bones may extend from one skeletal joint to another and may correspond to actual bones, limbs, or portions of bones and/or limbs of the user. The joint orientations discussed herein may be applied to these bones. For example, an elbow orientation may be used to define a forearm orientation.

The virtual skeleton may be used to recognize one or more gestures performed by user 108. As a non-limiting example, one or more gestures performed by user 108 may be used to trigger scrolling of the user interface responsive to movements of the user and the virtual skeleton may be analyzed over one or more frames to determine if the one or more gestures have been performed. For example, a conformation of a hand joint of the virtual skeleton may be determined, and virtual pointer 112 may be moved based on the position of the hand joint. It is to be understood, however, that a virtual skeleton may be used for additional and/or alternative purposes without departing from the scope of this disclosure.

Figure 3:
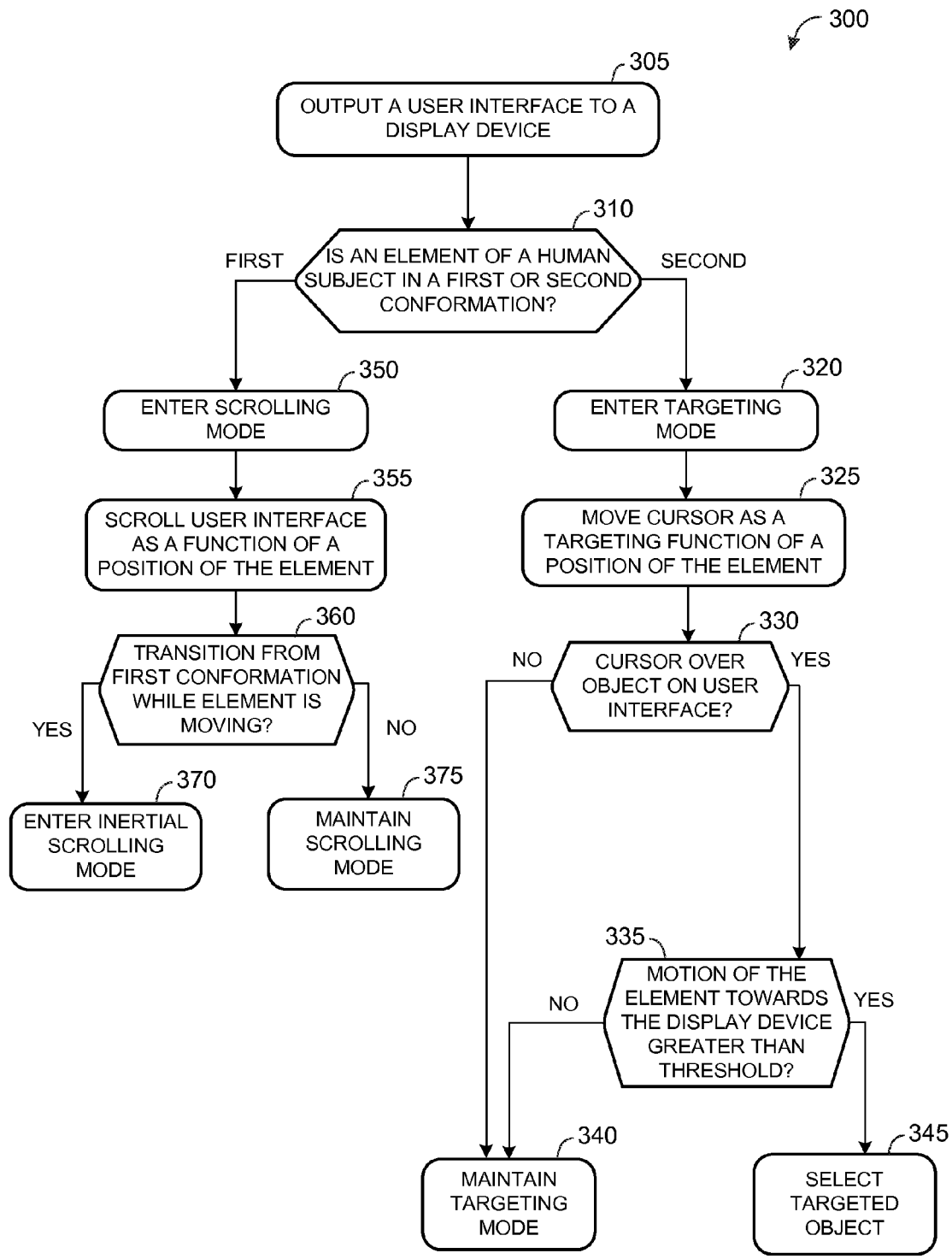
FIG. 3 is a flow chart illustrating a method for navigating a scrollable user interface according to an embodiment of the present disclosure.
Figure 4:
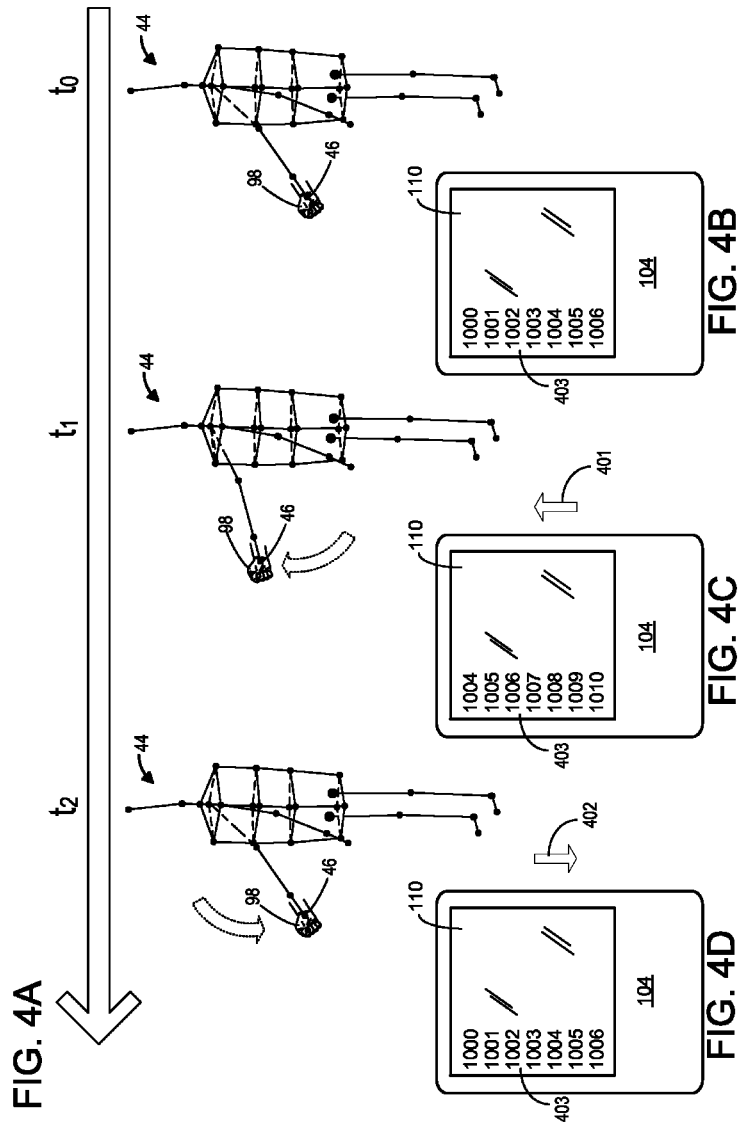
FIG. 4A schematically shows a virtual skeleton adopting a plurality of positions over time in accordance with embodiments of the present disclosure.
FIGS. 4B-4D show a user interface responding to a hand joint position of the virtual skeleton of FIG. 4A.
Figure 5:
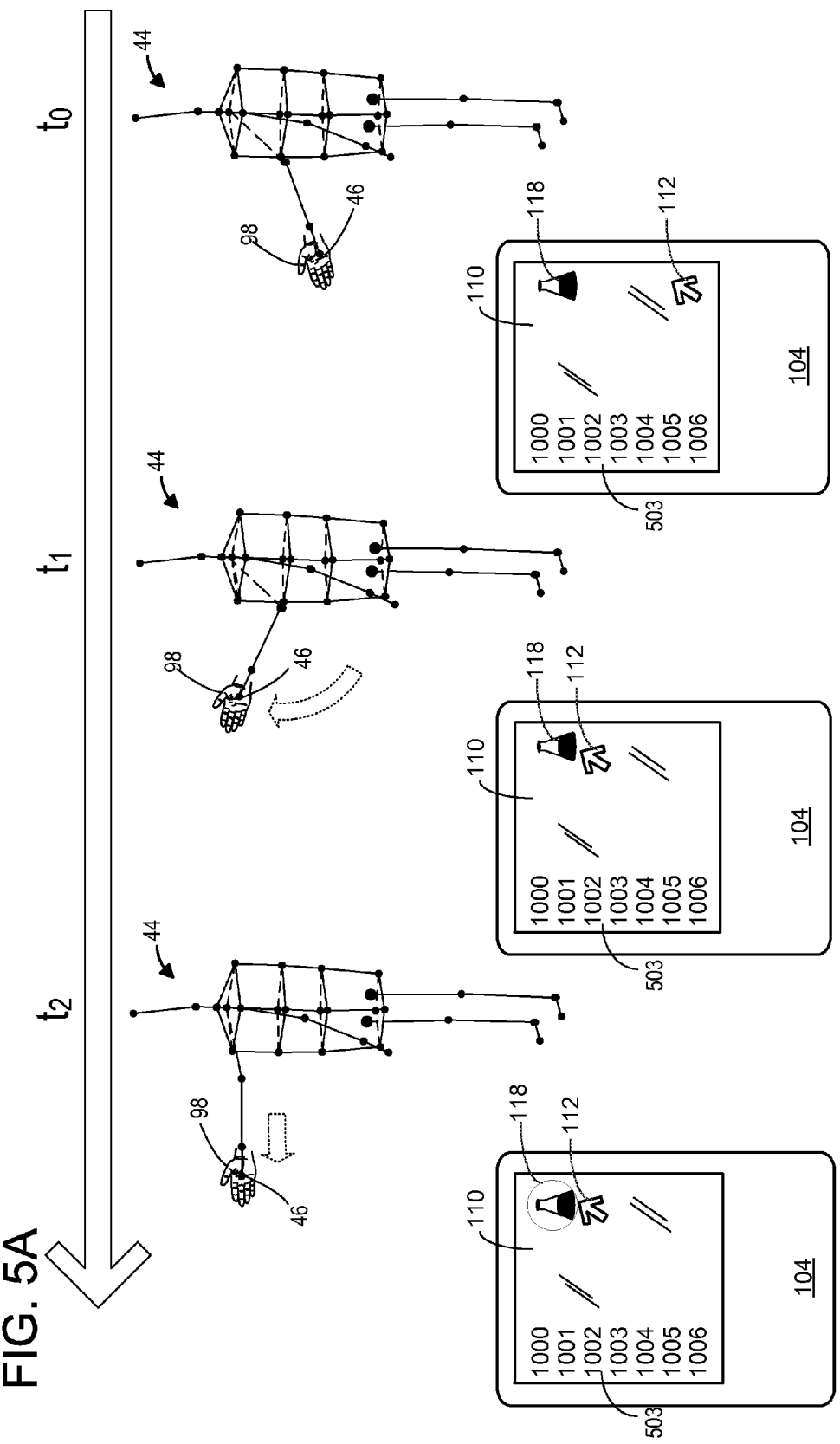
FIG. 5A shows a virtual skeleton adopting a plurality of positions over time in accordance with embodiments of the present disclosure.
FIGS. 5B-5D show a user interface responding to a hand joint position of the virtual skeleton of FIG. 5A.
Figure 11:
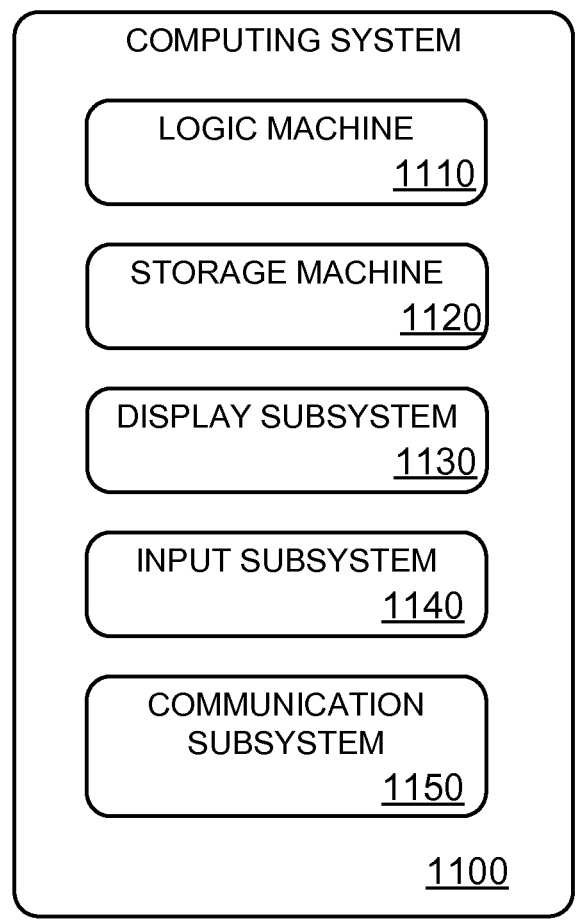
FIG. 11 schematically shows a computing system in accordance with an embodiment of the present disclosure.

FIG. 3 shows a flow chart for an example method 300 for presenting a user interface. For example, method 300 may be used to present user interface 110 as depicted in FIG. 1. Method 300 may be implemented in the form of instructions stored on a storage machine and executed by a logic machine, for example storage machine 1120 and logic machine 1110 as shown in FIG. 11. For example, entertainment device 102 may include a storage machine holding instructions for method 300 and a logic machine configured to execute the instructions.

At 305, method 300 may include outputting a user interface to a display device. For example, user interface 110 may be output to display device 104 as depicted in FIG. 1. The display device may be separate from the entertainment device, or may be integrated in the entertainment device. The scrollable user interface may only present a subset of information in a viewable content area at one time, and thus a user may scroll through the presented information to reach a desired portion of the scrollable user interface.

At 310, method 300 may include determining if an element of a human subject is in a first or second conformation. For example, method 300 may include determining if hand 98 of user 108 is in a closed-grip or open-grip conformation. Determining if an element of a human subject is in a first or second conformation may include receiving a virtual skeleton of a human subject modeled from a depth image from a depth camera, the virtual skeleton including a virtual hand joint modeling a three-dimensional position of a hand of the human subject. For example, depth camera 106 may take depth image 32 of user 108. Depth image 32 may be used to generate virtual skeleton 44, including virtual hand joint 46, modeling a three-dimensional position of hand 98 of user 108.

Further, virtual hand joint 46 may then be used to determine if hand 98 of user 108 is in a closed-grip conformation or an open-grip conformation. Determining if hand 98 is in a closed-grip conformation or an open-grip conformation may further include analyzing a portion of the depth, infrared, and/or color images corresponding to a position of the virtual hand joint. In other words, the position of the hand joint may be used to locate which portions of other image data should be analyzed. Such portions may be analyzed using machine learning techniques to determine the conformation.

In some examples, a virtual skeleton may include a suitable number of hand and/or finger joints to facilitate a determination of whether the hand of the human subject is in a closed-grip conformation or open-grip conformation.

In some examples, determining if the hand of the human subject is in a closed-grip conformation or open-grip conformation further includes determining the conformation of the hand by recognizing a transition of the hand from one conformation to another conformation. For example, it may be difficult to conclusively determine if a user's hand is in an open-grip conformation when the hand is moving rapidly, but it may be possible to determine that the user's hand has transitioned from a closed-grip conformation to a conformation that is not a closed-grip conformation.

If the element of the human subject is determined to be in a first conformation, method 300 may proceed to 350. If the element of the human subject is determined to be in a second conformation, method 300 may proceed to 320.

At 350, method 300 may include entering a scrolling mode. For example, method 300 may enter a scrolling mode when a hand of the user is in a closed-grip conformation. At 355, method 300 may include scrolling the user interface responsive to movement of the element. For example, if the hand of the user is in a closed-grip conformation, the user interface may scroll responsive to movement of the virtual hand-joint modeling a three-dimensional position of the hand. Scrolling the user interface in this manner is discussed further below and with regards to FIGS. 4A-4D.

In some examples, scrolling the user interface responsive to movement of the element includes scrolling the user interface in three dimensions responsive to movement of the element in three dimensions. For example, the user interface may be a graphic representation of a landscape or other three-dimensional game playing area. The user, by moving the user's hand while in a closed-grip conformation, may be able to pan, scroll, and zoom across and through the landscape depicted on the display device in three dimensions.

It should be understood that the user interface may be scrolled in an unrestricted manner. In other words, a user may scroll the user interface to any desired position. The user interface need not scroll by increments the same width as the display. Further, such scrolling may be presented as a visually smooth movement of the user interface across the display. Additionally, one or more sections of the user interface may be weighted so that the user interface may be scrolled with an unrestricted flow, but at the same time naturally favors stopping on weighted sections of particular interest. Weighted sections may be used to decrease the likelihood that a user will stop scrolling on a less useful section of the user interface.

At 360, method 300 may include identifying a transition from the first conformation while the element is moving. For example, the user may be holding a hand in a closed-grip conformation, then move the hand and release the grip into an open-grip conformation, or otherwise transition out of the closed-grip conformation. Other examples for transitions from the first conformation are discussed further below and with regards to FIGS. 7A-8D. If such a transition is identified, method 300 may include entering an inertial scrolling mode, as shown at 370. An example sub-method for inertial scrolling a user interface is shown by method 600 in FIG. 6. If no such transition is identified at 360, method 300 may include maintaining the user interface in a scrolling mode, as shown at 375.

Returning to 310, if the element of the human subject is determined to be in a second conformation, method 300 may proceed to 320. At 320, method 300 may include entering a targeting mode. In some examples, the targeting mode may allow the user to target objects in the user interface that appear on the display device. In some embodiments, if the element is in a second conformation, different than the first conformation, the user may target objects of the user interface responsive to movement of the element without scrolling the user interface. For example, while right hand joint 46 is in an open-grip conformation, the user may target objects of the user interface responsive to movement of the virtual hand joint without scrolling the user interface. In some examples, the user interface includes a cursor that moves as a targeting function of a position of the element when targeting.

At 325, method 300 may include moving a cursor as a targeting function of a position of the element. In other words, the user interface may include a cursor that changes position on the user interface to reflect movement of the user's hand while the hand is in an open-grip conformation. The cursor may be a display object, such as virtual pointer 112 as shown in FIG. 1. In some examples, the cursor may not be shown on the display device. For example, the appearance of display objects on the user interface may be altered to reflect the positioning of an unseen cursor on or near a display object.

At 330, method 300 may include determining whether a cursor is positioned over an object on the user interface. As described above, in some examples, the appearance of the object may be altered to reflect the positioning of a cursor over the object. In some examples, display objects may be configured to be selectable by the user when the cursor is positioned over the object. Some display objects may not be selectable, even if the cursor is positioned over the object. As nonlimiting examples, selectable objects may include icons, buttons, items on a list, display objects involved in gameplay, and/or virtually any other displayable object.

If the cursor is not positioned over a selectable object on the user interface, method 300 may include maintaining a targeting mode, as shown at 340. If the cursor is determined to be positioned over an object on the user interface (e.g., within a threshold proximity), method 300 may include determining if there is motion of the element towards the display device greater than a threshold distance, as shown at 335. If such motion is detected at 335, method 300 may include selecting the targeted object, as shown at 345. If movement of the element towards the display device greater than a threshold distance is not detected, method 300 may include maintaining a targeting mode, as shown at 340. In other words, when a cursor is over a selectable object on the user interface, the user may select the object by moving an element in the second conformation towards the display device. For example, the user may extend a hand in an open-grip conformation towards the display device to select an object targeted by a cursor. The user may also decline to select a targeted object, and move the cursor to target a different object displayed on the user interface. The targeting and selecting of objects on the user interface is described further below and with regard to FIGS. 5A-5D.

As introduced above, a scrollable user interface may be controlled by the movements of a human target via the skeletal modeling of depth maps. For example, FIGS. 4A-5D and 7A-10D schematically show virtual skeleton 44 modeling different gestures of a human subject at different moments in time (e.g., time $t_0$, time $t_1$, and time $t_2$). As discussed above, virtual skeleton 44 can be derived from depth information acquired from a depth camera observing the human target. While virtual skeleton 44 is illustrated as a jointed stick figure, it is to be understood that the virtual skeleton may be represented by any suitable machine readable data structure. For example, the joints illustrated as dots in FIG. 4A may be represented by positional coordinates and/or other machine readable information. As such, a logic subsystem of a computing system may receive the virtual skeleton (i.e., data structure(s) representing the virtual skeleton in machine readable form) and process the position and/or other attributes of one or more joints. In this way, the skeletal position/movement, and therefore the conformations of the modeled human subject, may be interpreted as different gestured controls for controlling aspects of the user interface.

FIG. 4A shows virtual skeleton 44 including virtual hand joint 46. In this example, virtual hand joint 46 is configured to represent a conformation of right hand 98 of a human subject, shown here in a closed-grip conformation. At time $t_0$, the right arm of the virtual skeleton is in a lowered position. FIG. 4B shows user interface 110 including list 403 displayed on display device 104 at time $t_0$.

At time $t_1$ of FIG. 4A, virtual skeleton 44 moves the position of right hand joint 46 upwards from the position at $t_0$, while the human subject maintains right hand 98 in a closed-grip conformation. As discussed with regard to FIG. 3, moving an element while in a first conformation (e.g. moving a hand in a closed-grip conformation) may cause user interface 110 to scroll as a function of the movement of the element. FIG. 4C shows the user interface scrolling upwards as a function of the movement of the element in the first conformation, as indicated by the upwards arrow 401 and the upwards scrolling of list 403. It is to be understood that an upward hand movement may cause scrolling in the opposite direction without departing from the scope of this disclosure.

As indicated at time $t_2$ of FIG. 4A, virtual skeleton 44 moves the position of right hand joint 46 downwards from the position at $t_1$, while the human subject maintains right hand 98 in a closed-grip conformation. FIG. 4D shows the user interface scrolling downwards as a function of the movement of the element in the first conformation, as indicated by the downwards arrow 402 and the downwards scrolling of list 403. If the position of right hand joint 46 at time $t_2$ is equivalent to the position of right hand joint 46 at time $t_0$, as shown in FIG. 4A, user interface 110 may display the same information as at time $t_0$, as shown by the visible content of list 403 in FIGS. 4B and 4D. However, scrolling may be based on hand velocity and/or other parameters than absolute hand position. Further, it is to be understood that a downward hand movement may cause scrolling in the opposite direction without departing from the scope of this disclosure.

FIG. 4C depicts user interface 110 and list 403 scrolling upwards in response to the upwards movement of right hand joint 46. However, user interface 110 may also be configured to scroll in the opposite direction from movement of right hand joint 46. In other words, user interface 110 may be configured to scroll as if the user were controlling the frame of reference, or if the user were controlling the positioning of objects within the same frame of reference.

In some embodiments, the absolute movement of a hand joint away from a default hand joint position is used as the basis for determining the amount of scrolling of the user interface. In some embodiments, the relative position of a hand joint to a shoulder joint or other reference joint is used as the basis for determining the amount of scrolling. Translation of hand joint movement to user interface scrolling does not have to be in a 1:1 ratio. In some embodiments, an observed hand joint position may be translated into a scrolling distance using a linear or nonlinear translation function. In other words, a certain amount of hand movement may cause different amounts of scrolling depending on the position of the hand, velocity of the hand, acceleration of the hand and/or parameters of the scrollable interface.

While FIGS. 4A-4D depict scrolling in one dimension responsive to hand joint 46 moving in an up-and-down direction, it is to be understood that scrolling of the user interface may occur in two or three dimensions responsive to hand joint 46 moving in two or three dimensions. In some examples, the scrolling of user interface 110 may be constrained to scrolling in one or two dimensions, and thus movement of hand joint 46 may be constrained or projected to one or two dimensions. For example, list 403 may be scrollable in one dimension. As virtual skeleton 44 moves right hand 46 in an up-or-down direction (e.g. along a y-axis), right hand 46 may actually be moving closer to or further from the display device (e.g. along a z-axis) along with movement of the right arm joint. The movement of the hand along the z-axis may be de-emphasized or constrained to a projection along the y-axis. In some examples, the user interface may be scrollable in two dimensions, for example a grid of objects scrollable along the x and y axes. Thus, the movement along the z-axis may be de-emphasized or constrained to a projection along the x and y-axes.

FIG. 5A shows virtual skeleton 44 including virtual hand joint 46. In this example, virtual hand joint 46 is configured to represent a conformation of right hand 98 of a human subject, shown here in an open-grip conformation. At time $t_0$, the right arm of the virtual skeleton is shown in a lowered position. FIG. 5B shows user interface 110 including list 503, interface object 118, and virtual pointer 112 displayed on display device 104 at time $t_0$.

At time $t_1$ of FIG. 5A, virtual skeleton 44 moves the position of right hand joint 46 upwards from the position at $t_0$, while the human subject maintains right hand 98 in an open-grip conformation. As discussed with regard to FIG. 3, moving an element while in a second conformation (e.g. moving a hand in an open-grip conformation) may cause virtual pointer 112 to move on user interface 110 as a function of the movement of the element. FIG. 5C shows virtual pointer 112 moving upwards as a function of the movement of the element in the second conformation at time $t_1$. As discussed with regard to FIG. 3, while right hand joint 46 is in an open conformation, the user may target objects on the user interface, for example object 118. Positioning virtual pointer 112 on or near object 118 may cause object 118 to change in appearance as an indication that object 118 may be selected by the user. Virtual pointer 112 is depicted as an arrow, but may take on other appearances, or may be configured to not be displayed on user interface 110. While in targeting mode, the user interface may not scroll as a function of movement of hand joint 46, as depicted by list 503 remaining stationary on user interface 110.

In some embodiments, the absolute movement of a hand joint away from a default hand joint position is used as the basis for determining the targeting of virtual pointer 112 on the user interface. In some embodiments, the relative position of a hand joint to a shoulder joint or other reference joint is used as the basis for determining the amount of cursor movement. Translation of hand joint movement to cursor targeting does not have to be in a 1:1 ratio. In some embodiments, an observed hand joint position may be translated into a virtual pointer movement distance using a linear or nonlinear translation function. In other words, a certain amount of hand movement may cause different amounts of virtual pointer movement depending on the position of the hand, and/or parameters of the user interface.

While FIGS. 5A-5C depict targeting in one dimension reflective of hand joint 46 moving in an up-and-down direction, it is to be understood that targeting of virtual pointer 112 may occur in two or three dimensions reflective of hand joint 46 moving in three dimensions. In some examples, the targeting of virtual pointer 112 may be constrained to targeting in one or two dimensions, and thus movement of hand joint 46 may be constrained or projected to one or two dimensions.

At time $t_2$ of FIG. 5A, virtual skeleton 44 moves the position of right hand joint 46 forwards from the position at $t_1$, while the human subject maintains right hand 98 in an open-grip conformation. FIG. 5D depicts object 118 being selected by the user in response to the movement of right hand joint 46 towards display device 104.

In some examples, an object of the user interface is selected responsive to movement of the element over a threshold distance in the direction of the display device when the cursor engages the object. In some examples, an object of the user interface may be selected responsive to movement of the element over a certain velocity or acceleration. In some examples, an object of the user interface may be selected responsive to movement of the element along a distance compared to distances along other axes. In some examples, the targeting of an object may result in constraining or projecting movement of an element along an axis or axes. In some examples, a user may select an object by moving an element towards a display device, and may de-select the object by moving the element away from the display device.

Figure 6:
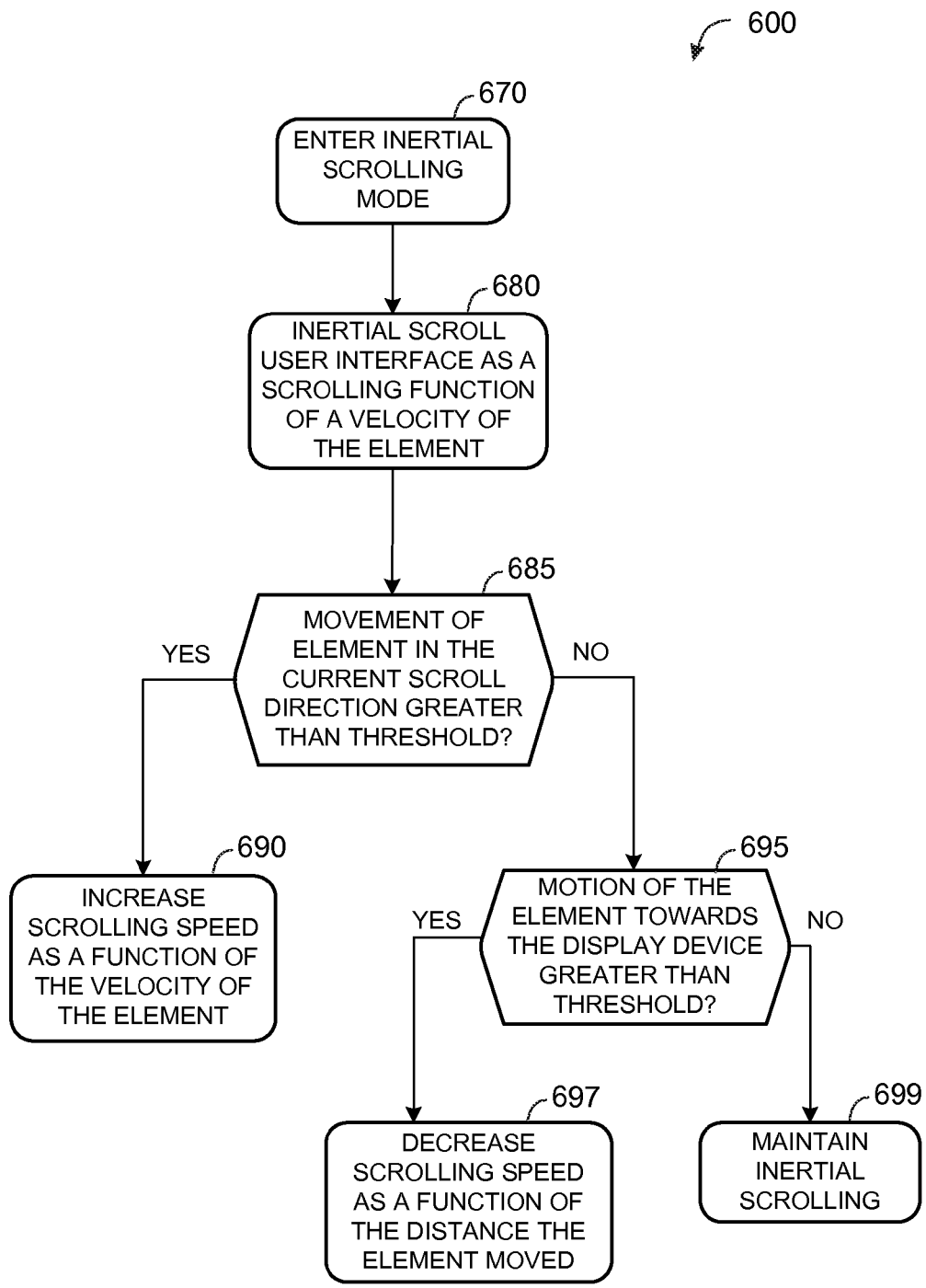
FIG. 6 is a flow chart illustrating a method for navigating a scrollable user interface according to an embodiment of the present disclosure.
Figure 7:
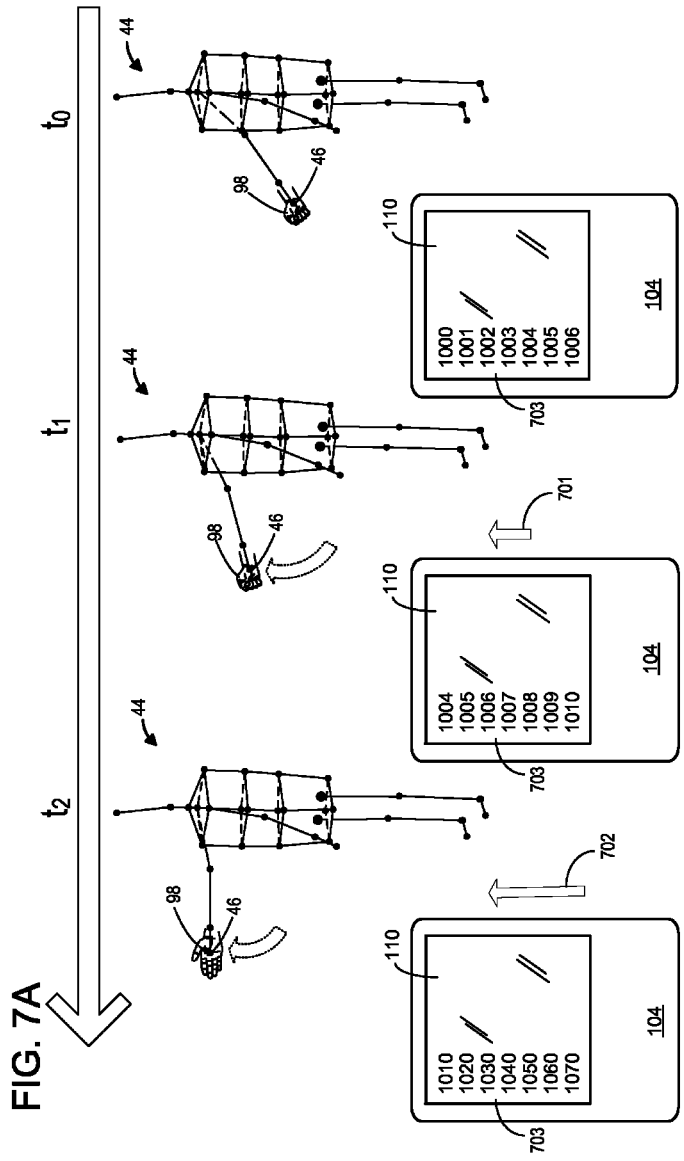
FIG. 7A shows a virtual skeleton adopting a plurality of positions over time in accordance with embodiments of the present disclosure.
FIGS. 7B-7D show a user interface responding to a hand joint position of the virtual skeleton of FIG. 7A.
Figure 8:
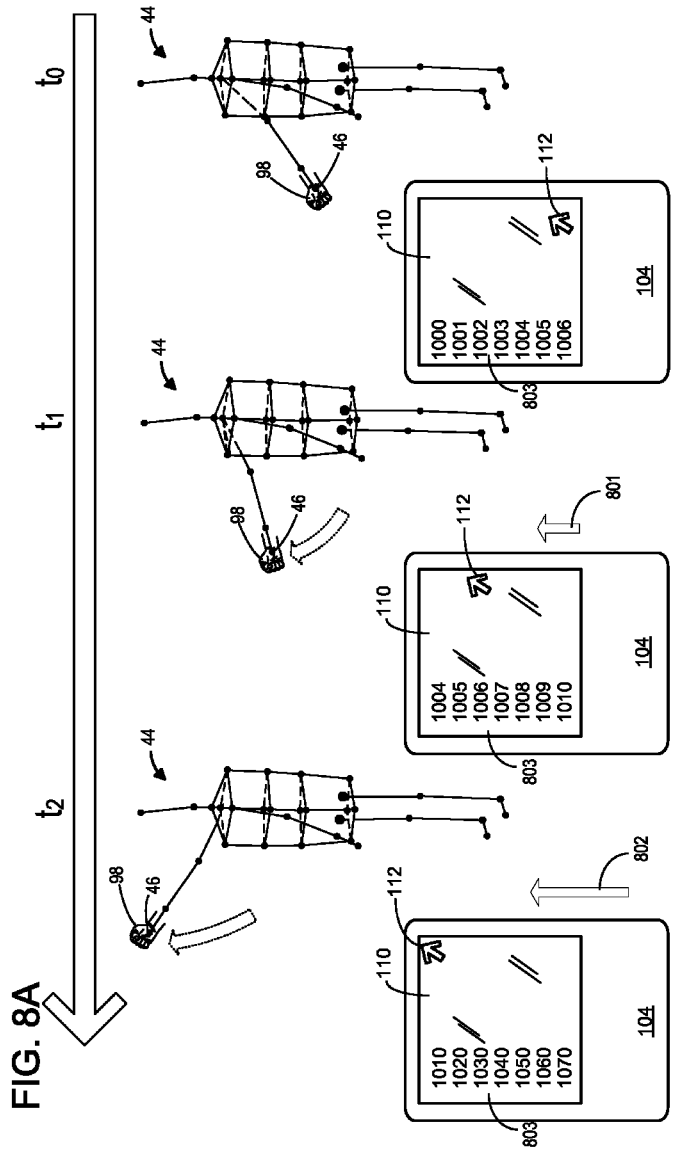
FIG. 8A shows a virtual skeleton adopting a plurality of positions over time in accordance with embodiments of the present disclosure.
FIGS. 8B-8D show a user interface responding to a hand joint position of the virtual skeleton of FIG. 8A.
Figure 9:
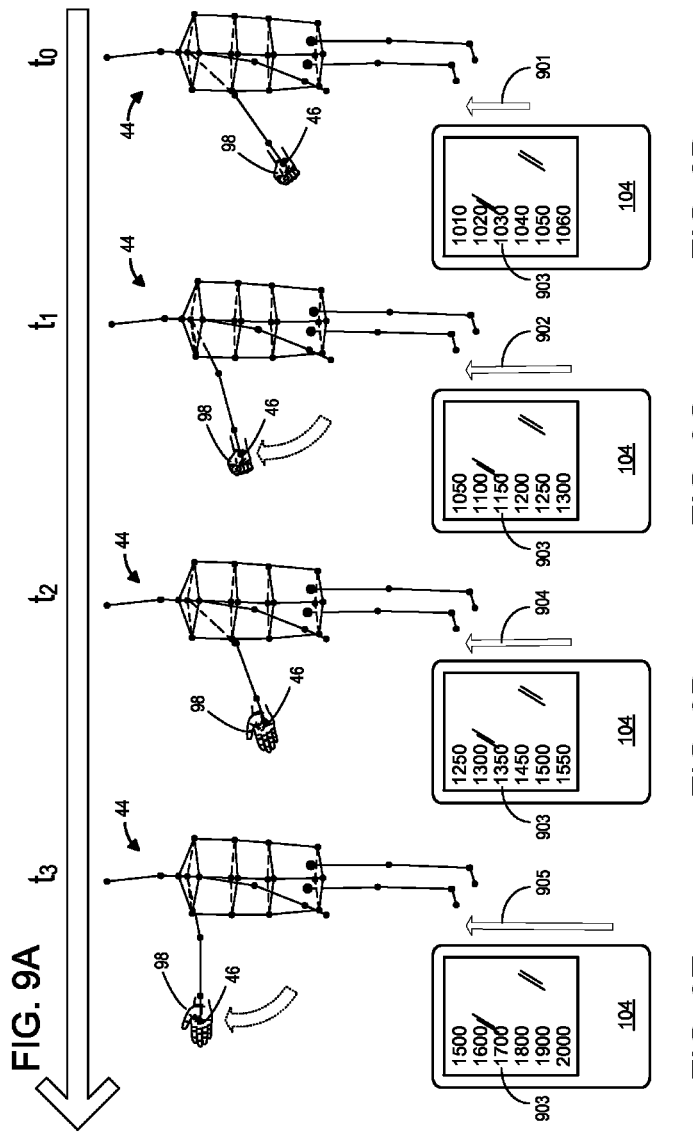
FIG. 9A shows a virtual skeleton adopting a plurality of positions over time in accordance with embodiments of the present disclosure.
FIGS. 9B-9E show a user interface responding to a hand joint position of the virtual skeleton of FIG. 9A.
Figure 10:
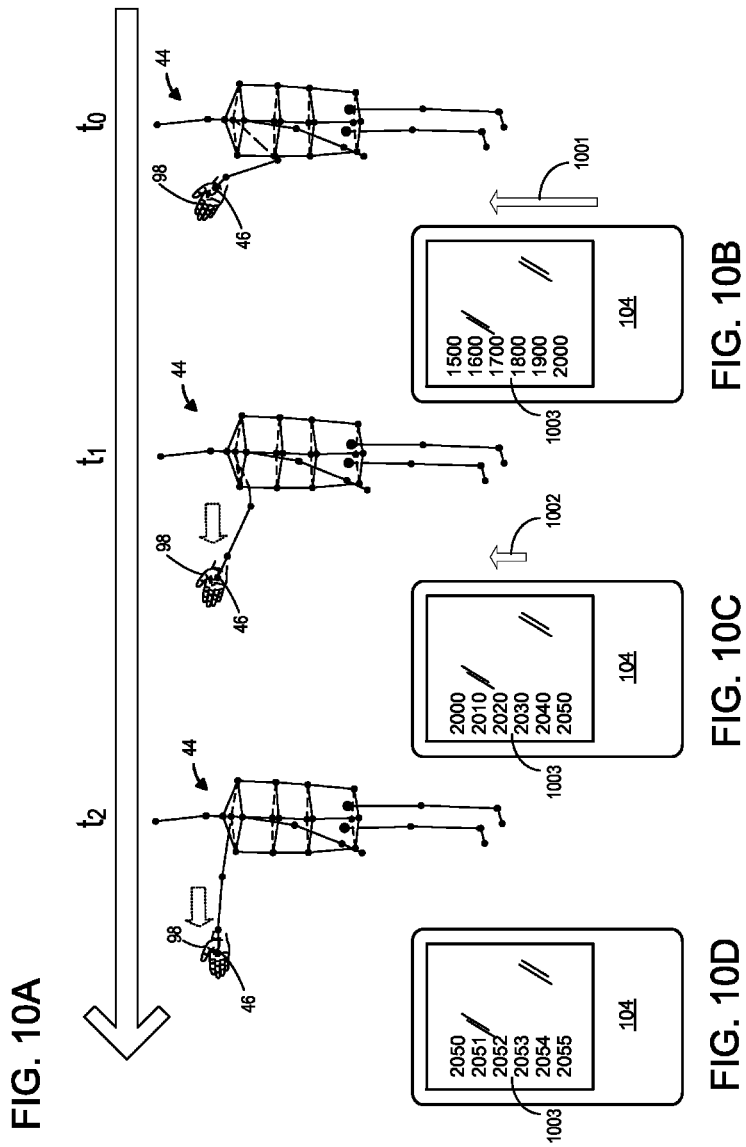
FIG. 10A shows a virtual skeleton adopting a plurality of positions over time in accordance with embodiments of the present disclosure.
FIGS. 10B-10D show a user interface responding to a hand joint position of the virtual skeleton of FIG. 10A.

FIG. 6 shows an example method 600 for controlling a user interface. Method 600 may be run as a sub-routine of method 300 or other similar methods, or may be employed as a self-standing routine. Method 600 may be implemented in the form of instructions stored on a storage machine and executed by a logic machine, for example storage machine 1120 and logic machine 1110 as shown in FIG. 11. For example, entertainment device 102 may include a storage machine holding instructions for method 600 and a logic machine configured to execute the instructions.

At 670, method 600 may include entering an inertial scrolling mode. As a sub-routine of method 300, 670 may be the equivalent of 370. As described with regards to FIG. 3, an inertial scrolling mode may be entered upon detecting a transition of an element from a first conformation while the element is moving.

At 680, method 600 may include inertial scrolling the user interface as a scrolling function of a velocity of the element. In other words, if the user interface depicts a virtual globe, the user may fling the globe around a virtual axis with a velocity. In some examples, this may include inertial scrolling the user interface as a scrolling function of a velocity of the element during a time period that includes a transition of the element from the first conformation. In some examples, where the element is a hand of a human subject, method 600 may include inertial scrolling the user interface as a scrolling function of a velocity of the hand of the human subject during a time period that includes a transition of the hand from the first conformation.

At 685, method 600 may include determining if there is movement of the element in the current scroll direction greater than a threshold. In other words, if the user interface is scrolling in an upwards direction, method 600 may include determining if there is movement of the element in an upwards direction greater than a threshold. If movement of the element in the current scroll direction greater than a threshold is detected, method 600 may proceed to 690.

At 690, method 600 may include increasing the scrolling speed as a function of the velocity of the element. In the example where the user interface is a virtual globe, while the virtual globe is rotating around a virtual axis, the user may increase the rotation speed of the globe by flinging the globe in the direction of rotation. In some examples, increasing the scrolling speed as a function of the velocity of the element may include inertial scrolling the user interface with increased speed in a current scroll direction responsive to subsequent movements of the element in a direction that is substantially similar to the current scroll direction. For example, the user interface may inertial scroll with increased speed in a current scroll direction responsive to subsequent movements of a hand of a human subject over a threshold distance in a direction that is substantially similar to the current scroll direction.

If movement of the element in the current scroll direction greater than a threshold is not detected, method 600 may proceed to 695. At 695, method 600 may include determining if there is motion of the element towards the display device greater than a threshold. If motion of the element towards the display device greater than a threshold is not detected, method 600 may maintain the inertial scrolling mode, as shown at 699. If motion of the element towards the display device greater than a threshold is detected, method 600 may proceed to 697.

At 697, method 600 may include decreasing the scrolling speed as a function of the distance the element moved. In the example where the user interface is a virtual globe, while the globe is rotating around a virtual axis, the user may slow rotation of the globe by reaching out and touching the globe. In some examples, this may include reducing the speed of inertial scrolling as a function of a distance the element moves along an axis perpendicular to the display device. For example, the speed of inertial scrolling may decrease as a function of a distance a hand of a human subject moves along an axis perpendicular to the display device. In other words, while the user interface is inertial scrolling, the human subject may slow or stop the inertial scrolling by extending a hand towards the display screen. In some examples, the user may not select objects on the screen by extending a hand towards the display screen during inertial scrolling. Rather, the user may stop the inertial scrolling when the user identifies an object of interest, and then select the object in a subsequent targeting and selection mode. Examples for entering inertial scrolling mode are discussed further below and with regards to FIGS. 7A-7D and 8A-8D. Examples for increasing inertial scrolling speed are discussed further below and with regards to FIGS. 9A-9D. Examples for decreasing inertial scrolling speed are discussed further below and with regards to FIGS. 10A-10D.

FIG. 7A shows virtual skeleton 44 including virtual hand joint 46. In this example, virtual hand joint 46 is configured to represent a conformation of right hand 98 of a human subject. At $t_0$, right hand 98 is shown in a closed-grip conformation. FIG. 7B shows user interface 110 including list 703 displayed on display device 104 at time $t_0$.

At time $t_1$ of FIG. 7A, virtual skeleton 44 moves the position of right hand joint 46 upwards from the position of the right hand joint at $t_0$, while the human subject maintains right hand 98 in a closed-grip conformation. As discussed with regard to FIGS. 3 and 4A-4D, moving an element while in a first conformation (e.g. moving a hand in a closed-grip conformation) may cause user interface 110 to scroll as a function of the movement of the element. FIG. 7C shows the user interface scrolling upwards as a function of the movement of the element in the first conformation, as indicated by the upwards arrow 701 and the upwards scrolling of list 703.

At time $t_2$ of FIG. 7A, virtual skeleton 44 moves the position of right hand joint 46 upwards from the position of the right hand joint at $t_1$, while the human subject transitions right hand 98 from a closed-grip conformation to an open-grip conformation. As described with regards to FIG. 3, detection of a transition from the first conformation to a conformation that is not the first conformation while the element is moving may cause inertial scrolling of user interface 110. FIG. 7D shows the user interface inertial scrolling upwards as a function of the velocity of the element, as indicated by upwards arrow 702 and the inertial scrolling of list 703. In other words, the user interface may scroll with inertia even while the hand stops movement upwards responsive to the previous movement and conformational transition of the hand of the human subject.

In some examples, inertial scrolling of the user interface may include generating an inertial vector as an inertial function of movement of the element during a time period that includes a transition of the element from the first conformation and inertial scrolling the user interface in the direction of the inertial vector. A storage machine may be configured to store instructions to generate an inertial vector as an inertial function of a direction of movement of the hand of the human subject during a time period that includes a transition of the hand from the first conformation and inertial scroll the user interface in the direction of the inertial vector.

In other words, a vector may be generated based on the movement of the element to determine the direction of the inertial scrolling. A logic machine may record the movements of virtual hand joint 46. Upon transition of hand joint 46 from a closed-grip to an open-grip conformation, the logic machine may analyze data regarding the position of hand joint 46 retrospectively from the moment in time hand joint 46 began moving (e.g. $t_0$ of FIG. 7A) until at least the moment in time when hand joint 46 transitions out of the closed-grip conformation (e.g. $t_2$ of FIG. 7A). An inertial vector may then be generated as a function of the movement of hand joint 46, and user interface 110 may inertial scroll in that direction.

In some examples, the data regarding movement of the element may be filtered to generate an inertial vector in a direction corresponding to a dominant direction of movement by the element. For example, a human subject may move a hand along the z-axis during the transition from the closed-grip conformation, despite moving the hand primarily along the y-axis before the transition from the closed-grip conformation. The data may be filtered to de-emphasize the data surrounding the transition.

While FIGS. 7A-7D depict inertial scrolling in one dimension reflective of hand joint 46 moving in an up-and-down direction, it is to be understood that inertial scrolling of the user interface may occur in three dimensions responsive to hand joint 46 moving in three dimensions. In some examples, the inertial scrolling of user interface 110 may be constrained to scrolling in one or two dimensions and the movement of hand joint 46 may be projected to one or two dimensions. For example, list 703 may be scrollable in one dimension. As virtual skeleton 44 moves right hand 46 in an up-or-down direction (e.g. along a y-axis), right hand 46 may actually be moving closer to or further from the display device (e.g. along a z-axis) along with movement of the right arm joint. The data along the z-axis may be de-emphasized, constrained, or projected onto the y-axis in the generation of the inertial vector.

In some examples, the user interface may be inertial scrollable in two dimensions, for example a grid of objects inertial scrollable along the x and y axes. Thus, the movement along the z-axis may be disregarded or constrained to a projection along the x and y-axes. In some examples, the inertial vector may be a one-dimensional vector with coordinates in a three-dimensional space.

In some examples, inertial scrolling may be initiated with the inertial scrolling occurring at a predetermined speed. In other examples, the initial inertial scrolling speed may be a function of a magnitude of a velocity of the element. As described for the generation of an inertial vector, data collected regarding movement of the element may be filtered to determine a magnitude of the velocity of the element. For example, a human subject may move a hand at a constant speed before the transition from the closed-grip conformation, and then move the hand with decreased speed during and/or after the transition. The data may be filtered to de-emphasize the data surrounding the transition. The resulting magnitude may then be used to generate an inertial scrolling speed.

In some examples, the speed of the inertial scrolling of the user interface may decrease over time after initiation, for example, with a virtual coefficient of friction. The virtual coefficient of friction may be set to a value equal to 0, in which case the speed of the inertial scrolling would remain constant until additional input is received.

As described above, it may be difficult to conclusively determine if a user's hand is in an open-grip conformation when the hand is moving rapidly, but it may be possible to determine that the user's hand has transitioned from a closed-grip conformation to a conformation that is not a closed-grip conformation. In some examples, determining if the hand of the human subject has transitioned from the closed-grip conformation may include determining that the hand of the human subject is no longer in a closed-grip conformation. In some examples, recognizing the transition of the hand from one conformation to another conformation includes determining that the hand has reached a virtual boundary. In some embodiments, the virtual boundary may include positions where the hand is no longer visible by a depth camera.

In some embodiments, where the user interface includes a cursor that moves as a targeting function of a position of the element, the transition of the element may be characterized by the cursor moving to a boundary of the user interface. In some embodiments, where the user interface includes a cursor that moves as a targeting function of a position of a hand of a human subject, the transition of the hand from one conformation to another may be characterized by the cursor moving to a boundary of the user interface.

FIG. 8A shows virtual skeleton 44 including virtual hand joint 46. In this example, virtual hand joint 46 is configured to represent a conformation of right hand 98 of a human subject, shown here in a closed-grip conformation. At time $t_0$, the right arm of the virtual skeleton is in a lowered position. FIG. 8B shows user interface 110 including list 803, and virtual pointer 112 displayed on display device 104 at time $t_0$.

At time $t_1$ of FIG. 8A, virtual skeleton 44 moves the position of right hand joint 46 upwards from the position at time $t_0$, while the human subject maintains right hand 98 in a closed-grip conformation. As discussed with regard to FIG. 3 and FIGS. 4A-4D, moving an element while in a first conformation (e.g. moving a hand in a closed-grip conformation) may cause user interface 110 to scroll as a function of the movement of the element. FIG. 8C shows the user interface scrolling upwards as a function of the movement of the element in the first conformation, as indicated by upwards arrow 801 and the upwards scrolling of list 803. In this example, virtual pointer 112 is also depicted as moving as a function of the movement of the element in the first conformation. Virtual pointer 112 is shown moving upwards along with list 803.

As indicated at time $t_2$ of FIG. 8A, virtual skeleton 44 moves the position of right hand joint 46 upwards from the position at $t_1$, while the human subject transitions right hand 98 while remaining in a closed-grip conformation. In this example, the movement of right hand joint 46 causes virtual pointer 112 to reach a boundary of display device 104. The action of the cursor reaching a boundary is recognized as being representative of hand joint 46 transitioning out of a closed-grip conformation. This may cause the user interface to scroll with inertia responsive to the movement and transition of the hand of the human subject, as depicted in FIG. 8D by arrow 802 and the inertial scrolling of list 803.

As described above with regards to FIG. 6, when the user interface is inertial scrolling, the user may increase the speed of the inertial scrolling by moving an element in a current scrolling direction. In other words, the user may move a hand in the same direction as the user interface is inertial scrolling in order to increase the speed of the inertial scrolling.

FIG. 9A shows virtual skeleton 44 including virtual hand joint 46. In this example, virtual hand joint 46 is configured to represent a conformation of right hand 98 of a human subject. At time $t_0$, the right arm of the virtual skeleton is in a lowered position and right hand 98 is in a closed-grip conformation. FIG. 9B shows user interface 110 including list 903 at time $t_0$. At time $t_0$, user interface 110 is inertial scrolling in an upwards direction, as indicated by arrow 901 and list 903.

As indicated at time $t_1$ of FIG. 9A, virtual skeleton 44 moves the position of right hand joint 46 upwards from the position at $t_0$, while the human subject maintains right hand 98 in a closed-grip conformation. As the movement of right hand joint 46 is in substantially the same direction as the inertial scrolling direction, the speed of inertial scrolling may thus be increased as a function of the velocity of right hand joint 46, as indicated by arrow 902 and the increased speed of inertial scrolling of list 903 as depicted in FIG. 9C.

Increasing the speed of inertial scrolling by moving an element in the direction of the inertial scrolling may not be dependent on the conformation of the element. As indicated at time $t_2$ of FIG. 9A, the human subject transitions right hand 98 to an open-grip conformation, but this transition does not impact the speed of inertial scrolling, as indicated by arrow 904 and list 903 shown in FIG. 9D. At time $t_3$ of FIG. 9A, virtual skeleton 44 moves the position of right hand joint 46 upwards from the position at $t_2$, while the human subject maintains right hand 98 in an open-grip conformation. As the movement of right hand joint 46 is in substantially the same direction as the inertial scrolling direction, the speed of inertial scrolling may thus be increased as a function of the velocity of right hand joint 46, as indicated by arrow 905 and the increased speed of inertial scrolling of list 903 shown in FIG. 9D.

Determining the inertial scrolling speed as a function of the velocity of movement of an element may include collecting data regarding movement of the element from the point in time where the element begins moving to the point in time where the element stops moving, and further include filtering the collected data in order to determine the direction and magnitude of the velocity of the element. If the direction of the velocity of the element is substantially similar to the direction of inertial scrolling, the speed of the inertial scrolling user interface may be increased proportionate to the magnitude of the velocity of the movement of the element.

Although depicted as inertial scrolling in one dimension in FIGS. 9B-9E, user interface 110 may inertial scroll in two or three dimensions responsive to movement of the element in two or three dimensions. In some embodiments, when an inertial scroll direction has been determined, subsequent movement by the user may be constrained or projected onto an axis of the inertial scroll direction. As depicted in FIG. 9A, movement of a hand in an upwards motion may further include movement of the hand along the z-axis, as the hand joint may not maintain a single axis of movement when the user moves an arm joint. This motion along the z-axis may be constrained, projected onto an axis of the inertial scroll direction or may be de-emphasized when determining the velocity of the hand.

As described above with regards to FIG. 6, when the user interface is inertial scrolling, the user may decrease the speed of the inertial scrolling by moving an element along an axis perpendicular to the display device. In other words, the user may move a hand toward the display device in order to decrease the speed of the inertial scrolling.

FIG. 10A shows virtual skeleton 44 including virtual hand joint 46. In this example, virtual hand joint 46 is configured to represent a conformation of right hand 98 of a human subject, shown here in an open-grip conformation. As shown at time $t_0$, the right arm of the virtual skeleton is in a position close to the body of the virtual skeleton. FIG. 10B shows user interface 110 including list 1003 displayed on display device 104 at time $t_0$. In FIG. 10B, user interface 110 is inertial scrolling, as depicted by arrow 1001 and list 1003.

At time $t_1$ of FIG. 10A, virtual skeleton 44 has moved right hand joint into a position partially extended away from the body of the virtual skeleton. In an example where the user is facing the display device 104, right hand joint 46 is moved along an axis perpendicular to display device 104. This action may cause the speed of inertial scrolling to decrease, as depicted by arrow 1002 and list 1003 as shown in FIG. 10C. In some embodiments, the hand joint may need to extend at least a threshold distance to decrease the inertial scrolling.

At time $t_2$ of FIG. 10A, virtual skeleton 44 moves right hand joint 46 into a position fully extended away from the body of the virtual skeleton. In an example where the user is facing the display device 104, right hand joint 46 is moved along an axis perpendicular to display device 104. This action may cause the inertial scrolling to stop, as depicted by list 1003 as shown in FIG. 10D. In some embodiments, the speed of inertial scrolling may decrease proportionate to the distance traveled by the hand joint towards the display device. In some embodiments, the hand joint may need to extend at least a threshold distance to stop the inertial scrolling. In some examples, the speed of inertial scrolling may decrease proportionate to the velocity or acceleration of the hand towards the display device.

In some embodiments, the methods and processes described above may be tied to a computing system of one or more computing devices. In particular, such methods and processes may be implemented as a computer-application program or service, an application-programming interface (API), a library, and/or other computer-program product.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic machine 1110 and a storage machine 1120. Computing system 1100 may optionally include a display subsystem 1130, input subsystem 1140, communication subsystem 1150, and/or other components not shown in FIG. 11.

Logic machine 1110 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1120 includes one or more physical devices configured to hold instructions executable by the logic machine to implement the methods and processes described herein. When such methods and processes are implemented, the state of storage machine 1120 may be transformed—e.g., to hold different data.

Storage machine 1120 may include removable and/or built-in devices. Storage machine 1120 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1120 may include volatile, nonvolatile, dynamic, static, read/write, read-only, random-access, sequential-access, location-addressable, file-addressable, and/or content-addressable devices.

It will be appreciated that storage machine 1120 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1110 and storage machine 1120 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1110 executing instructions held by storage machine 1120. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1130 may be used to present a visual representation of data held by storage machine 1120. This visual representation may take the form of a graphical user interface (GUI). As the herein described methods and processes change the data held by the storage machine, and thus transform the state of the storage machine, the state of display subsystem 1130 may likewise be transformed to visually represent changes in the underlying data. Display subsystem 1130 may include one or more display devices utilizing virtually any type of technology. Such display devices may be combined with logic machine 1110 and/or storage machine 1120 in a shared enclosure, or such display devices may be peripheral display devices.

When included, input subsystem 1140 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1150 may be configured to communicatively couple computing system 1100 with one or more other computing devices. Communication subsystem 1150 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1150 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for presenting a user interface on a display device pursuant to movement of an element of a human subject, the method comprising:
   outputting the user interface to the display device, the user interface including a cursor that moves as a targeting function of a position of the element, where movement of the cursor to a boundary of the user interface is recognized as a transition of the element between different first and second conformations of the element;
when the element is in the first conformation, scrolling the user interface responsive to movement of the element;
when the element is in the second conformation, targeting one or more objects of the user interface responsive to movement of the element, without scrolling the user interface; and
inertially scrolling the user interface as a scrolling function of a velocity of the element during a time period that includes a transition of the element from the first conformation, the user interface inertially scrolling with an amplified speed in a current scrod direction responsive to subsequent movement of the element in a direction similar to the current scroll direction, wherein user interface inertial scrolling speeds are not limited to the velocity of the element.

2. The method of claim 1, where scrolling the user interface responsive to movement of the element includes scrolling the user interface in three dimensions responsive to movement of the element in three dimensions.

3. The method of claim 1 further comprising selecting an object of the user interface responsive to movement of the element over a threshold distance in the direction of the display device, when the cursor engages the object.

4. The method of claim 1, further comprising:
generating an inertial vector as an inertial function of movement of the element during a time period that includes a transition of the element from the first conformation; and
inertially scrolling the user interface in the direction of the inertial vector.

5. The method of claim 1, further including reducing the speed of inertial scrolling proportionately to a distance the element moves along an axis perpendicular to the display device.

6. A storage machine holding instructions executable by a logic machine to:
output a user interface to a display device;
receive a virtual skeleton of a human subject modeled from a depth image from a depth camera, the virtual skeleton including a virtual hand joint modeling a three-dimensional position of a hand of the human subject;
use the virtual hand joint to determine whether the hand of the human subject is in a closed-grip conformation or in an open-grip conformation;
when the hand is in the closed-grip conformation, scrolling the user interface in each of three dimensions responsive to movement of the virtual hand joint in each of three dimensions;
when the hand is in the open-grip conformation, target objects of the user interface responsive to movement of the virtual hand joint without scrolling the user interface;
inertially scroll the user interface in three dimensions as a scrolling function of a velocity of the hand of the human subject and as an inertial function of a direction of movement of the hand of the human subject in three dimensions during a time period that includes a transition of the hand from the the closed grip conformation; and
decrease the speed of inertial scrolling as a continuously variable function of a distance the hand of the human subject moves along an axis perpendicular to the display device.

7. The storage machine of claim 6, where using the virtual hand joint to determine if the hand of the human subject is in a closed grip conformation or open grip conformation includes analyzing a portion of the depth image corresponding to a position of the virtual hand joint.

8. The storage machine of claim 7, where analyzing a portion of the depth image corresponding to the position of the virtual hand joint includes comparing the portion of the depth image to machine-learned depth images corresponding to known hand joint conformations.

9. The storage machine of claim 7, where determining whether the hand of the human subject is in a closed grip conformation or in an open grip conformation further includes determining the conformation of the hand by recognizing a transition of the hand from one conformation to another conformation.

10. The storage machine of claim 9, where recognizing the transition of the hand from one conformation to another conformation includes determining that the hand has reached a virtual boundary.

11. The storage machine of claim 9, where the user interface includes a cursor that moves as a targeting function of a position of the hand of the human subject, and where movement to a boundary of the user interface is recognized as a transition of the hand from one conformation to another conformation.

12. The storage machine of claim 7, further holding instructions to:
generate an inertial vector as an inertial function of a direction of movement of the hand of the human subject during a time period that includes a transition of the hand from the first conformation; and
inertially scroll the user interface in the direction of the inertial vector.

13. The storage machine of claim 7, further holding instructions to inertially scroll the user interface with increased speed in a current scroll direction responsive to subsequent movements of the hand of the human subject over a threshold distance in a direction that is substantially similar to the current scroll direction.

14. A method for presenting a user interface, comprising:
outputting a user interface to a display device;
receiving a virtual skeleton of a human subject modeled from a depth image from a depth camera, the virtual skeleton including a virtual hand joint modeling a three-dimensional position of a hand of the human subject;
analyzing a portion of the depth image corresponding to a position of the virtual hand joint to determine whether the hand of the human subject is in a closed-grip conformation or in an open-grip conformation;
when the hand is in the closed-grip conformation, scrolling the user interface in each of three dimensions responsive to movement of the virtual hand joint in each of three dimensions;
when the hand is in the open-grip conformation, targeting objects of the user interface responsive to movement of the virtual hand joint without scrolling the user interface;
initiate inertial scrolling of the user interface as a scrolling function of a velocity of the hand of the human subject during a time period that includes a transition of the hand from the closed-grip conformation; and
inertially scrolling the user interface in three dimensions in a direction of an inertial vector generated as an inertial function of a direction of movement of the hand of the human subject in three dimensions during the time period that includes a transition of the hand from the closed-grip conformation.

15. The method of claim 14, wherein the inertial vector is constrained to a projection along one or more dimensions during a condition where the user interface is constrained to inertial scrolling in one or two dimensions.

16. The method of claim 14, further comprising:
- if the hand is in the closed-grip conformation, simultaneously scrolling the user interface in two or more of three dimensions responsive to movement of the virtual hand joint in a corresponding two or more of three dimensions.

* * * * *